United States Patent
Sarafianos et al.

(10) Patent No.: US 10,345,142 B2
(45) Date of Patent: Jul. 9, 2019

(54) LASER DETECTION DEVICE WITH A DETECTION CELL AND DETECTION CIRCUIT AND METHODS OF FORMATION THEREOF

(71) Applicant: STMicroelectronics (Rousset) SAS, Rousset (FR)

(72) Inventors: Alexandre Sarafianos, Trets (FR); Clement Champeix, Saint-Cyprien (FR)

(73) Assignee: STMICROELECTRONICS (ROUSSET) SAS, Rousset (FR)

(*) Notice: Subject to any disclaimer, the term of this patent is extended or adjusted under 35 U.S.C. 154(b) by 192 days.

(21) Appl. No.: 15/444,529

(22) Filed: Feb. 28, 2017

(65) Prior Publication Data
US 2018/0094973 A1 Apr. 5, 2018

(30) Foreign Application Priority Data
Sep. 30, 2016 (FR) .................... 16 59448

(51) Int. Cl.
| | |
|---|---|
| *G01J 1/42* | (2006.01) |
| *G01J 1/44* | (2006.01) |
| *G06F 21/87* | (2013.01) |
| *H01L 23/00* | (2006.01) |
| *H01L 31/112* | (2006.01) |

(52) U.S. Cl.
CPC ............... *G01J 1/44* (2013.01); *G06F 21/87* (2013.01); *H01L 23/576* (2013.01); *H01L 31/112* (2013.01); *G01J 2001/4238* (2013.01)

(58) Field of Classification Search
CPC ... G01J 1/44; G01J 2001/4238; H01L 23/576; H01L 21/112; H01L 31/112; G06F 21/87
See application file for complete search history.

(56) References Cited

U.S. PATENT DOCUMENTS

| | | | |
|---|---|---|---|
| 4,103,181 A * | 7/1978 | Moreau | H01L 27/0248 327/427 |
| 8,258,405 B2 | 9/2012 | Wimmer et al. | |
| 2005/0236683 A1* | 10/2005 | Shapiro | G06F 21/87 257/428 |
| 2006/0081912 A1* | 4/2006 | Wagner | G06K 19/07372 257/316 |
| 2007/0170537 A1* | 7/2007 | Poenar | H01L 31/1884 257/462 |

(Continued)

FOREIGN PATENT DOCUMENTS

| | | |
|---|---|---|
| FR | 2981783 A1 | 4/2013 |
| JP | 2008198700 A * | 8/2008 |

*Primary Examiner* — Que Tan Le
*Assistant Examiner* — Jennifer D Bennett
(74) *Attorney, Agent, or Firm* — Slater Matsil, LLP

(57) ABSTRACT

A laser detection device can be used to protect an integrated circuit. The device includes a detection cell having a buried channel of a first conductivity type extending in a substrate of the integrated circuit. The substrate is of a second conductivity type. The detection cell also has a first electrical connection coupling a first point in the buried channel to a supply voltage rail, and a second electrical connection coupled to a second point in the buried channel. A detection circuit is coupled to the second point in the buried channel via the second electrical connection and adapted to detect a fall in the voltage at the second point.

21 Claims, 3 Drawing Sheets

(56) References Cited

U.S. PATENT DOCUMENTS

| | | |
|---|---|---|
| 2007/0177363 A1 | 8/2007 | Jayanetti |
| 2009/0251168 A1* | 10/2009 | Lisart .................. H01L 23/576 |
| | | 326/8 |
| 2011/0193616 A1* | 8/2011 | Amanuma ....... G06K 19/07381 |
| | | 327/514 |
| 2012/0056639 A1 | 3/2012 | Oomura |
| 2013/0193437 A1 | 8/2013 | Lisart et al. |
| 2014/0111230 A1 | 4/2014 | Lisart et al. |

\* cited by examiner

LASER DETECTION DEVICE WITH A DETECTION CELL AND DETECTION CIRCUIT AND METHODS OF FORMATION THEREOF

CROSS-REFERENCE TO RELATED APPLICATIONS

This application claims the priority benefit of French Patent application number 1659448, filed on Sep. 30, 2016, the contents of which is hereby incorporated by reference in its entirety to the maximum extent allowable by law.

TECHNICAL FIELD

The present disclosure relates to the field of integrated circuits protected from laser attacks.

BACKGROUND

Certain devices, such as payment card chips and SIM (subscriber identity module) cards, are likely to store or process sensitive data that should be kept secret. Examples of sensitive data include encryption keys or other data processed during a cryptographic operation. A fraudster attempting to access the sensitive data may use a laser, generally applied to the back side of the integrated circuit, to introduce electrical disturbances in the circuit during its operation, which then allows information regarding the sensitive data to be discovered.

It has been proposed to provide detection devices for detecting the presence of such laser attacks. When an attack is detected by such a detection device, a counter measure can be triggered, which may for example involve resetting the device and/or the destruction of the sensitive data. The device may even be permanently disabled if for example a certain number of attacks are detected within a relatively short time interval.

A drawback of existing detection devices for detecting laser attacks is that they tend to be ineffective for certain types of laser attacks, and/or occupy a relatively large chip area.

SUMMARY

According to one aspect, there is provided a laser detection device for protecting an integrated circuit. The device includes a detection cell having a buried channel of a first conductivity type extending in a substrate of the integrated circuit. The substrate is of a second conductivity type. The detection cell also has a first electrical connection coupling a first point in the buried channel to a supply voltage rail, and a second electrical connection coupled to a second point in the buried channel. A detection circuit is coupled to the second point in the buried channel via the second electrical connection and adapted to detect a fall in the voltage at the second point.

According to one embodiment, the buried channel has a width equal to or less than 1.5 µm.

According to one embodiment, the second point of the buried channel is connected to the first point via a first portion of the buried channel, and to a second portion of the buried channel.

According to one embodiment, the second portion is in the form of a spiral.

According to one embodiment, the buried channel is at a depth of at least 3 µm.

According to one embodiment, the detection circuit comprises a high resistance path between the second electrical connection and the supply voltage rail, and a transistor having its control node coupled to the second electrical connection.

According to one embodiment, the high resistance path comprises at least one diode.

According to one embodiment, the detection cell has a surface area of less than 100 µm$^2$.

According to a further aspect, there is provided an integrated circuit comprising a plurality of the above laser detection devices distributed across the integrated circuit.

According to one embodiment, the integrated circuit further comprises: a first layer of n-type and p-type wells comprising transistor devices; and buried wells of the first conductivity type formed in a further layer at a greater depth than the first layer, the buried channel being at a greater depth than the further layer.

According to one embodiment, the detection circuit is implemented in the first layer.

According to one embodiment, the integrated circuit further comprises a protection circuit coupled to an output of the detection circuit of each laser detection device and adapted to implement a counter measure if a laser is detected by one of the detection devices.

According to a further aspect, there is provided a method of forming a laser detection device for an integrated circuit, the method comprising: forming a buried channel of a first conductivity type extending in a substrate of the integrated circuit, the substrate being of a second conductivity type; forming a first electrical connection coupling a first point in the buried channel to a supply voltage rail; forming a second electrical connection for coupling a second point in the buried channel to a detection circuit adapted to detect a fall in the voltage at the second point.

According to one embodiment, the buried channel is formed to have a width equal to or less than 1.5 µm.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION OF ILLUSTRATIVE EMBODIMENTS

Throughout the following description, the term "connected" is used to designate a direct connection between circuit elements, whereas the term "coupled" is used to designate a connection that may be direct, or may be via one or more intermediate elements such as resistors, capacitors or transistors. The term "approximately" is used to designate a tolerance of plus or minus 10 percent of the value in question.

Relative terms that depend on an orientation of the device, such as "top", "bottom", "above", "below", "vertical" and "horizontal", should be interpreted herein with the device orientated as shown in the figures.

Figure 1A:
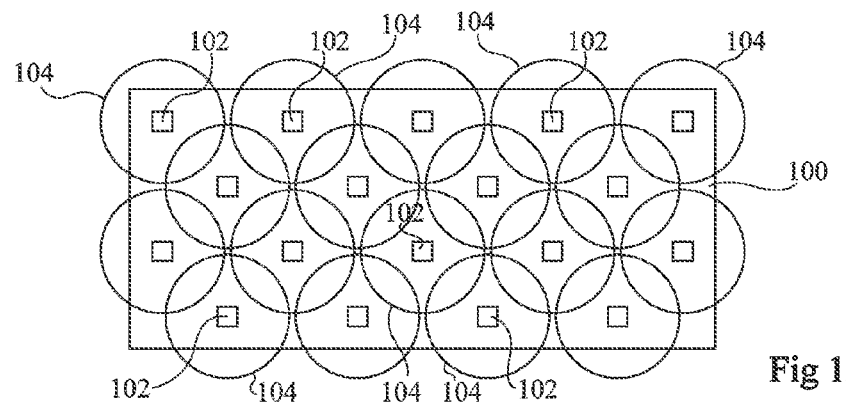
FIGS. 1A and 1B are plan views of an integrated circuit protected from laser attacks.

FIG. 1A is a plan view of an integrated circuit 100 comprising laser detection circuits 102 positioned at regular intervals across its surface. For example, the laser detection circuits 102 are spaced apart by distances of between 50 and 100 μm. Each circuit 102 is for example capable of detecting a laser pulse hitting the integrated circuit within a corresponding zone represented by circles 104 in FIG. 1A, for the case of a laser pulse having a duration of approximately 100 ns. It can be seen that the vast majority of the surface area of the integrated circuit is covered by the detection zones of the detection circuits 102.

Figure 1B:
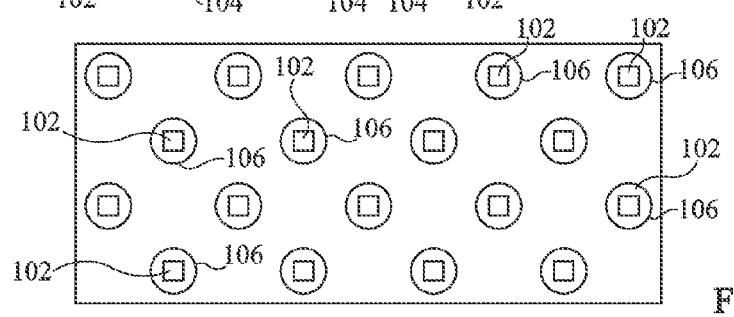

FIG. 1B is a plan view of the integrated circuit 100 and laser detection circuits 102 of FIG. 1A in which detection zones 106 of each detection circuit 102 correspond to the case of a relatively short laser pulse of approximately 30 ps. Indeed, the present inventors have found that laser attacks using relatively short laser pulses are detectable only relatively close to the impact point. The result is that a significant portion of the surface area of the integrated circuit is no longer covered by the detection zones 106 of the detections circuits 102.

To address this issue, one option that could be considered would be to simply increase the density of the detection circuits. However, this would result in more chip area being occupied, leaving less chip area available for implementing the desired functions of the circuit.

Figure 2A:
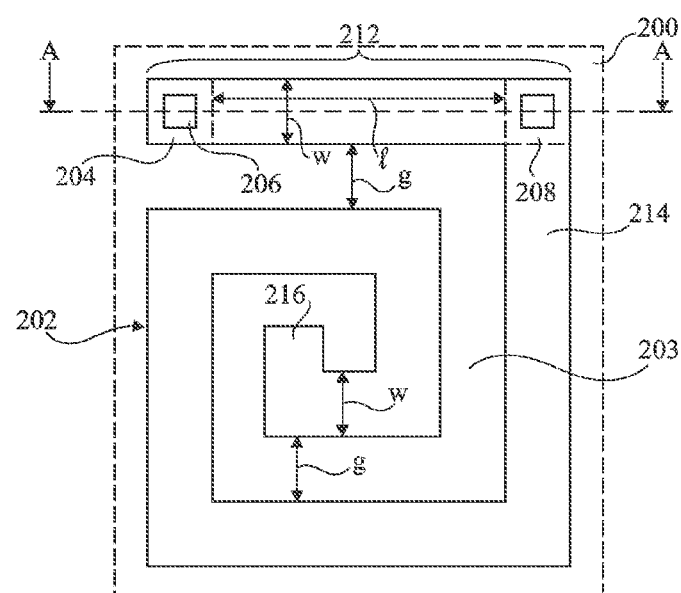
FIG. 2A is a plan view of a detection cell according to an example embodiment.

FIG. 2A is a plan view of a detection cell 200 of a laser detection device according to an example embodiment. The detection cell 200 for example comprises a doped channel 202 formed as a buried n-type well within a silicon substrate 203, which is for example a p-type substrate. The detection cell 200 for example has width and length dimensions of between 2 and 10 μn, and for example of approximately 5 μm. Thus the surface area of the detection cell 200 is for example less than 100 μm². The n-type channel 202 for example has a width w of around 1 μm, for example in the range 0.8 to 1.5 μm, and the gaps g between the portions of the channel are of around 1 μm, for example in the range 0.8 to 1.5 μm.

Two points along the n-type channel 202 are for example electrically connected to a detection circuit (not illustrated in FIG. 2A). For example, a first point along the channel is connected to the detection circuit via an n-type well 204 and a contact 206. A second point along the channel is for example connected to the detection circuit via an n-type well 208 and a contact 210. The length 1 of the n-type channel between the n-type wells 204 and 208 is for example in the range 2 to 15 μm. The n-type channel between the n-type wells 204, 208 for example provides a relatively high resistance path between the contacts 206, 210, for example of at least 1 kohm.

In the example of FIG. 2A, the n-type channel 202 is in the form of a spiral, although in other embodiments other forms would be possible. The spiral of FIG. 2A is for example formed of straight sections, facilitating the implantation step used to form the n-type channel 202. The points at which the channel 202 is connected to the detection circuit are for example at opposite ends of a straight portion 212 of the spiral. A further portion 214 of the spiral extends from the n-type well 208 to an end point 216 of the spiral close to the centre of the detection cell 200.

In operation, a supply voltage VDD is for example applied to the contact 206, and the contact 210 is for example clamped to a voltage at or close to the supply voltage VDD via a high resistance path. In view of the similarity between the voltages at the contacts 206, 210, only a relatively low current will flow through the n-type channel under normal conditions, and the voltage at the contact 210 will thus remain close to the voltage VDD. However, when a laser beam passes through the silicon substrate in the vicinity of the detection cell 200, electron/hole pairs will be generated. The holes will be conducted to ground via the p-type substrate, and the electrons will be attracted to the n-type channel 202, causing a current to flow from the contact 210 to ground via the portion 214 of the channel. This will in turn lead to a voltage drop at the contact 210, which can be detected by the detection circuit. Indeed, the voltage at the contact 210 will equal VDD-R*I, R being the resistance between the contacts 206, 210, and I being the generated current. In the example that R is equal to approximately 3 k ohm, a generated current of 200 μA in the channel will thus result in a voltage at the contact 210 of approximately 0.6 V below VDD.

The form of the n-type channel 202 is for example such that there are n-type and p-type regions in relatively close proximity across the detection cell 200, facilitating the conduction of the current, and thereby providing a relatively sensitive device. A spiral formation provides one such arrangement providing n and p-type regions in close proximity, but other formations of one or more n-type channels extending within the cell 200 would also be possible.

Figure 2B:
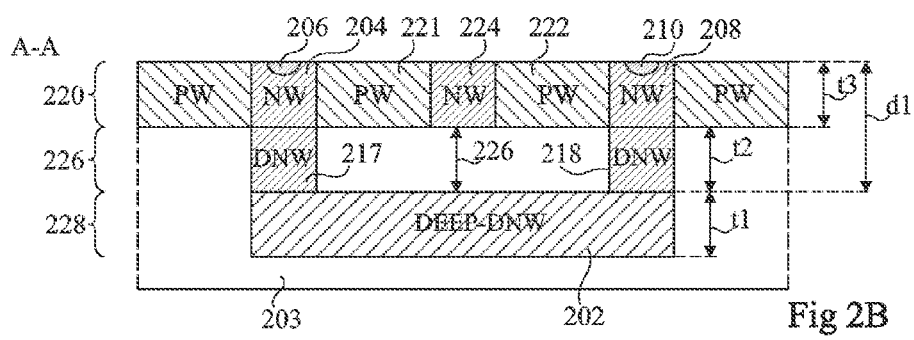
FIG. 2B is a cross section view of the detection cell of FIG. 2A according to an example embodiment.

FIG. 2B is a cross-section view of the structure of FIG. 2A, taken along a line A-A passing along the portion 212 and through the n-type wells 204, 208.

The top of the buried n-type channel 202 is for example at a depth d1 of between 3 and 6 μm below the surface of the silicon structure. The channel 202 for example has a thickness t1 of between 1 and 3 μm. The buried channel 202 is for example coupled to the contact 206 via a buried n-type well 217, and the n-type well 204. Similarly, the buried channel 202 is for example coupled to the contact 210 via a buried n-type well 218 and the n-type well 208. The buried n-type wells 217, 218 for example have a thickness t2 of between 1 and 3 μm, and the n-type wells 204, 208 for example have a thickness t3 of between 1 and 2 μm.

The n-type wells 204, 208 are for example formed within a layer 220 comprising p-type and n-type wells of the integrated circuit, in which transistor devices are formed (not illustrated in the figures). For example, the n-type wells 204, 208 are separated by p-type wells 221, 222 respectively neighboring the wells 204, 208, and by an n-type well 224 separating the p-type wells 221, 222. In alternative embodiments, the n-type wells 204, 208 could be separated by a single p-type well.

A spacing 226, between the buried n-type channel 202 and the n-type well 224 and in which the p-type substrate 203 is for example present, provides electrical isolation between these n-type regions. This spacing is for example of at least 1 μm. The buried n-type wells 217, 218 connecting the n-type wells 204, 208 respectively to the buried channel 202 are for example in a layer 226 between the layer 220 and a layer 228 of the buried channel.

Figure 3:
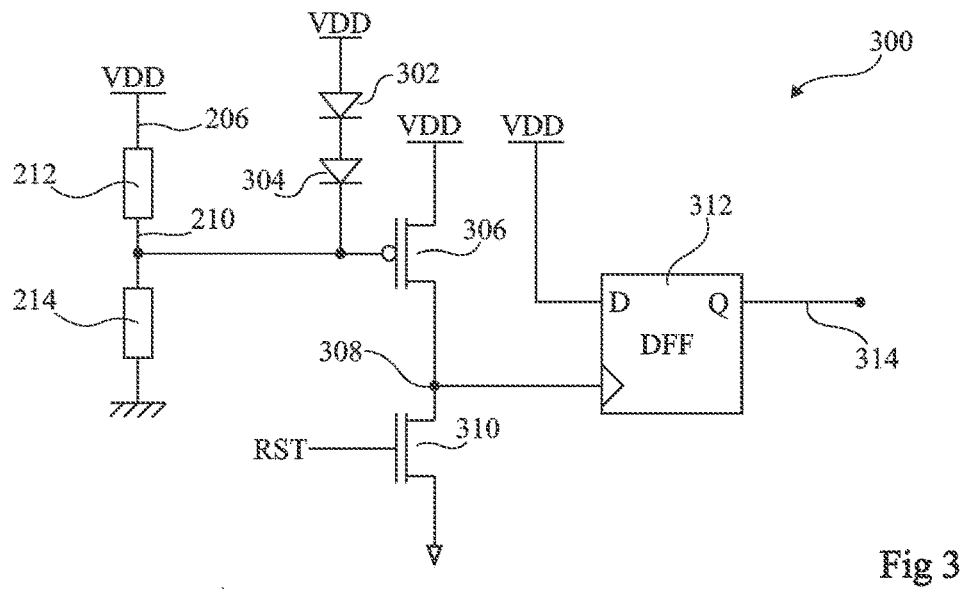
FIG. 3 schematically illustrates a detection circuit according to an example embodiment.

FIG. 3 schematically illustrates a detection circuit 300 according to an example embodiment. The buried channel 202 is represented by resistors 212 and 214 respectively representing the channel portion 212 between the contacts 206, 210, and the channel portion 214 coupled to the contact 210. The contact 206 is for example coupled to a VDD supply voltage rail, and the contact 210 is for example clamped to the VDD supply voltage rail via one or more diodes. In the example of FIG. 3, there are two such diodes 302, 304 coupled in series, the anode of the diode 302 being connected to the VDD supply rail, and the cathode of the diode 304 being connected to the contact 210. In some embodiments, the diodes 302, 304 are formed vertically in n-type well 208. In alternative embodiments, the high resistance path between the contact 210 and the VDD supply rail could be implemented by alternative means, such as by a resistor having a relatively high resistance.

The contact 210 is also coupled to the control node of a transistor 306. For example, the transistor 306 is a p-channel MOS transistor, and the contact 210 is connected to its gate. The transistor 306 is for example coupled by its main conducting nodes between the VDD supply rail and a further node 308. The node 308 is for example coupled to a ground rail via the main conducting nodes of a reset transistor 310, and to the clock input of a D-type flip-flop 312. A data input D of the flip-flop 312 is for example coupled to the VDD supply rail, and the output Q of the flip-flop is connected to a line 314 providing an alert signal when a laser is detected.

In operation, in the absence of a laser beam, the voltage at the contact 210 will remain close to the supply voltage VDD, and the transistor 306 will be non-conducting. The voltage 308 is for example low, having been reset by the reset transistor 310. When a laser beam falls on the detection cell 200, a current will be conducted by the n-type channel 202, flowing through the portions 212, 214 of the channel. Thus the voltage at the contact 210 will be pulled down, and the transistor 306 will be activated, causing the voltage at the node 308 to rise. The flip-flop 312 will thus clock the high logic level at its data input D to its data output Q, triggering the alert signal.

Figure 4:
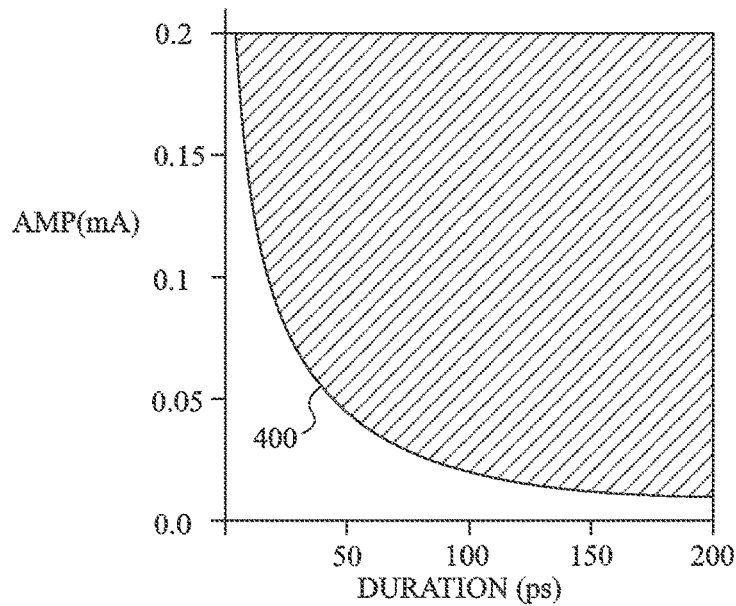
FIG. 4 is a graph representing laser detection as a function of the pulse amplitude and duration according to an example embodiment.

FIG. 4 is a graph illustrating an example of the performance of the detection cell 200 of FIGS. 2A and 2B as observed by the present inventors. A curve 400 indicates the minimum levels of the amplitude and duration of current pulses generated by a laser beam that will trigger the detection circuit. As illustrated, most pulses having a duration of at least 50 ps are detected, and for pulses having an amplitude of at least 100 μA, a pulse duration as low as 20 ps can be detected.

Figure 5:
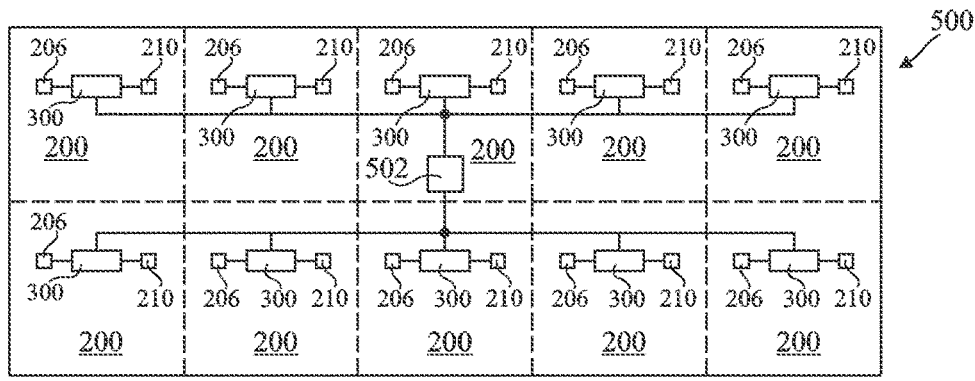
FIG. 5 schematically illustrates an integrated circuit protected from laser attacks according to an example embodiment.

FIG. 5 schematically represents an integrated circuit 500 comprising a regular distribution of laser detection devices as described herein. As illustrated, each laser detection device comprises a detection cell 200, coupled to a detection circuit 300 via the contacts 206, 210. Furthermore, the output lines of the detection circuits 300 are for example coupled to a protection circuit 502. For example, the outputs of the detection circuits 300 are coupled to the protection circuit 502 via an OR tree. The protection circuit 502 is for example configured to implement a counter measure if one or more of the detection circuits 300 detects a laser attack. The counter measure may for example involve resetting all or part of the integrated circuit, the destruction of sensitive data, etc.

Figure 6A:
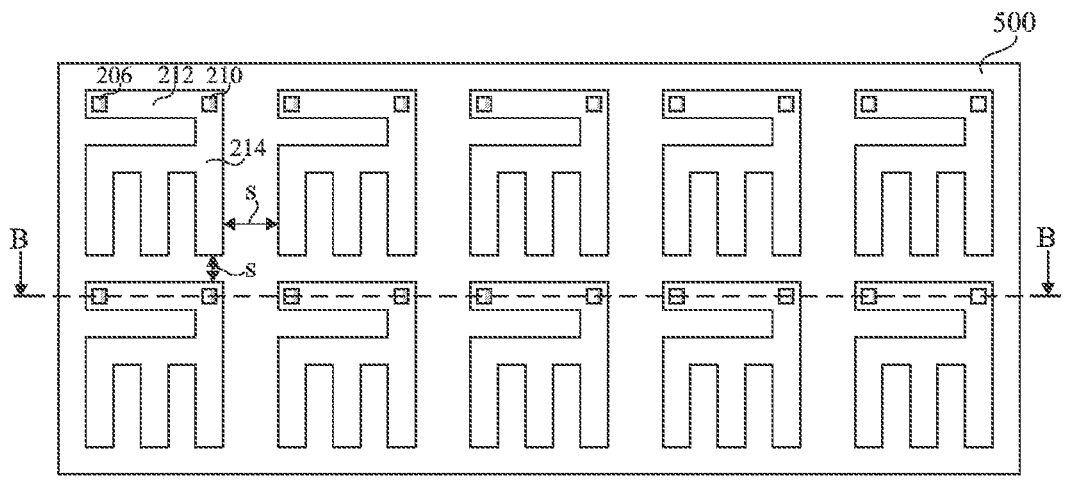
FIG. 6A is a plan view of the integrated circuit of FIG. 5 according to an example embodiment.

FIG. 6A is a plan view of the detection cells 200 of the integrated circuit 500 of FIG. 5 according to an example embodiment in which the buried n-type channels have a different form from a spiral. However, as with the spiral embodiment, the contacts 210 of each detection cell are for example positioned at an intermediate node between the portions 212 and 214 of the channel.

An advantage of the detection cell 200 proposed herein is that it is formed in a silicon level below the standard devices of the integrated circuit, and thus the detection cells 200 can be formed relatively close together without significantly reducing the available chip area. For example, the cells are spaced by a spacing s of only one or several μm from each other.

Figure 6B:
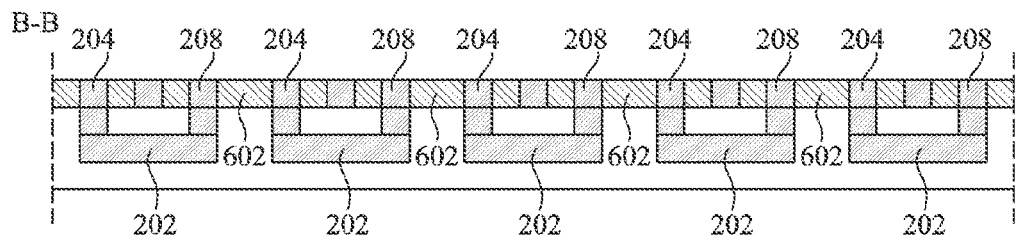
FIG. 6B is a cross-section view of the structure of FIG. 6A according to an example embodiment.

FIG. 6B is a cross-section view of the structure of FIG. 6A taken along a line B-B passing through the portion 212 of the buried channel of each detection cell. Each detection cell 200 has a cross-section similar to the one shown in FIG. 2B, and will not be described again in detail. In the example of FIG. 6B, the n-type wells 204, 208 of each detection cell are for example separated from the n-type wells 208, 204 of the adjacent cells by a single p-type well 602.

Figure 7:
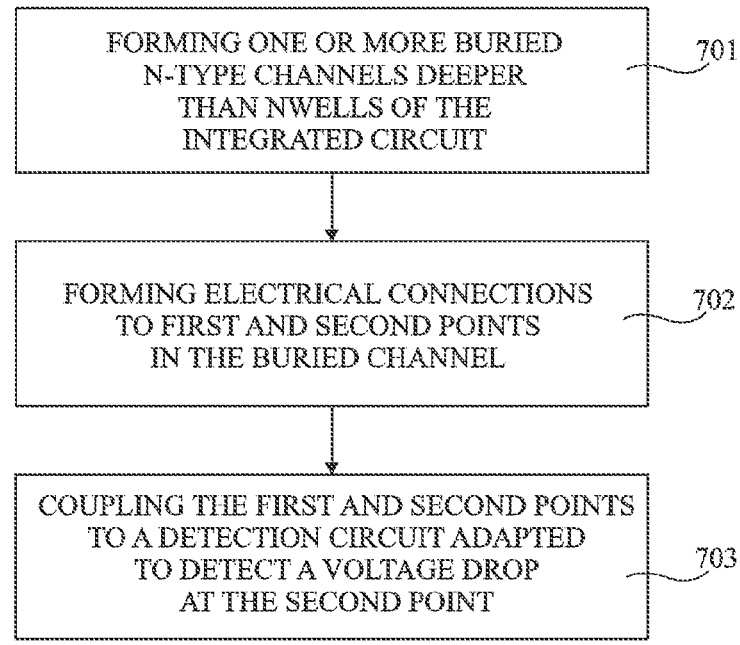
FIG. 7 is a flow diagram illustrating steps in a method of forming a laser detection device according to an example embodiment.

FIG. 7 is a flow diagram illustrating an example of steps in a method of forming a laser detection device for an integrated circuit according to an example embodiment of the present disclosure.

In a step 701, one or more buried n-type channels are formed, which are for example at a depth that is deeper than the n-type wells of the integrated circuit, and for example at least 1 μm below the n-type wells.

In a step 702, electrical connections are formed with first and second points of the buried channel. For example, buried n-type wells are formed for coupling each of the first and second points to a surface n-well of the integrated circuit, and contacts 206, 210 are formed as described above.

In a step 703, the first and second points of the buried channel are coupled, via the electrical connections, to a detection circuit adapted to detect a voltage drop at the second point.

An advantage of the embodiments described herein is that the detection cell of the laser detection device is particularly sensitive, and can be triggered by relatively short laser pulses. Furthermore, a relative high density of detection devices can be formed while maintaining a high chip area for the other devices of the integrated circuit.

Having thus described at least one illustrative embodiment, various alterations, modifications and improvements will readily occur to those skilled in the art. For example, while the embodiments described herein comprise an n-type channel buried in a p-type substrate, it will be apparent to those skilled in the art that in alternative embodiments the opposite conductivity types could be used for the buried channel and the substrate, the channel being p-type and the substrate being n-type.

Furthermore, it will be apparent to those skilled in that art that while FIGS. 5 and 6 describe an integrated circuit having ten laser detection devices, in practice the number of detection devices will depend on the size of the integrated circuit, and could be equal to hundreds, thousands, or even tens of thousands of detection devices distributed across the integrated circuit.

What is claimed is:
1. A laser detection device comprising:
a semiconductor body of a second conductivity type;
a detection cell disposed in the semiconductor body, the detection cell comprising:

a buried channel of a first conductivity type extending in the semiconductor body;

a first electrical connection coupling a first point in the buried channel to a supply voltage rail; and a second electrical connection coupled to a second point in the buried channel, wherein the second point of the buried channel is connected to the first point via a first portion of the buried channel, and the second point also being connected to a second portion of the buried channel, the second portion extending away from the first portion; and a detection circuit coupled to the second point in the buried channel via the second electrical connection and configured to detect a fall in a voltage at the second point.

2. The laser detection device of claim 1, wherein the buried channel has a width equal to or less than 1.5 µm.

3. The laser detection device of claim 1, wherein the second portion is formed as a spiral.

4. The laser detection device of claim 1, wherein the buried channel is at a depth of at least 3 µm.

5. The laser detection device of claim 1, wherein the detection circuit comprises:

a high resistance path between the second electrical connection and the supply voltage rail; and a transistor having a control node coupled to the second electrical connection.

6. The laser detection device of claim 5, wherein the high resistance path comprises a diode.

7. The laser detection device of claim 1, wherein the detection cell has a surface area of less than 100 micrometers squared.

8. A semiconductor device comprising:

a semiconductor body of a second conductivity type;

integrated circuitry disposed within the semiconductor body;

a plurality of laser detection devices distributed across the semiconductor device, each laser detection device disposed at a location in the semiconductor body and comprising:

a detection cell having a buried channel of a first conductivity type extending in the semiconductor body, a first electrical connection coupling a first point in the buried channel to a supply voltage rail, and a second electrical connection coupled to a second point in the buried channel; and a detection circuit coupled to the second point in the buried channel via the second electrical connection and configured to detect a fall in a voltage at the second point, wherein the detection circuit comprises:

a high resistance path between the second electrical connection and the supply voltage rail, and a transistor having a control node coupled to the second electrical connection.

9. The semiconductor device of claim 8, further comprising:

a first layer of the semiconductor body that has n-type and p-type wells disposed therein; and buried wells of the first conductivity type formed in a further layer at a greater depth than the first layer;

wherein the integrated circuitry comprises transistor devices disposed in the first layer; and wherein the buried channel is at a greater depth than the further layer.

10. The semiconductor device of claim 9, wherein the detection circuit is disposed in the first layer.

11. The semiconductor device of claim 8, further comprising a protection circuit coupled to an output of the detection circuit of each of the plurality of laser detection devices and configured to implement a counter measure if a laser is detected by one of the plurality of laser detection devices.

12. The semiconductor device of claim 8, wherein the buried channel has a width equal to or less than 1.5 µm.

13. The semiconductor device of claim 8, wherein the second point of the buried channel is connected to the first point via a first portion of the buried channel, and the second point also being connected to a second portion of the buried channel, the second portion formed as a spiral extending away from the first portion.

14. The semiconductor device of claim 8, wherein the buried channel is at a depth of at least 3 µm.

15. The semiconductor device of claim 8, wherein the detection circuit comprises:

a diode disposed in the high resistance path.

16. The semiconductor device of claim 8, wherein the detection cell has a surface area of less than 100 micrometers squared.

17. A method of forming a laser detection device for an integrated circuit, the method comprising:

forming a buried channel of a first conductivity type in a substrate of the integrated circuit, the substrate being of a second conductivity type;

forming a first electrical connection coupling a first point in the buried channel to a supply voltage rail; and forming a second electrical connection coupling a second point in the buried channel to a detection circuit configured to detect a fall in a voltage at the second point, wherein the second point of the buried channel is connected to the first point via a first portion of the buried channel, and the second point also being connected to a second portion of the buried channel, the second portion extending away from the first portion.

18. The method of claim 17, wherein the buried channel is formed to have a width equal to or less than 1.5 µm.

19. The method of claim 17, further comprising:

forming a plurality of n-type and p-type wells in a first layer of the substrate; and forming the detection circuit in the first layer of the substrate; and forming a plurality of transistors in the first layer of the substrate, the transistors forming integrated circuitry.

20. The method of claim 19, further comprising forming a plurality of buried wells of the first conductivity type in a further layer at a greater depth than the first layer, wherein the buried channel is at a greater depth than the further layer.

21. The method of claim 20, wherein the buried channel is at a depth of at least 3 µm.

* * * * *